(12) United States Patent
Goshima et al.

(10) Patent No.: US 8,047,614 B2
(45) Date of Patent: Nov. 1, 2011

(54) SEAT APPARATUS AND VEHICLE

(75) Inventors: Satoshi Goshima, Shinjuku-ku (JP);
Masami Handa, Shinjuku-ku (JP);
Morihiro Ichisugi, Yokohama (JP);
Toshiaki Sunaga, Yokohama (JP)

(73) Assignees: NHK Spring Co., Ltd., Yokohama-shi (JP); Fuji Heavy Industries, Ltd., Tokyo (JP)

( * ) Notice: Subject to any disclaimer, the term of this patent is extended or adjusted under 35 U.S.C. 154(b) by 115 days.

(21) Appl. No.: 12/153,871

(22) Filed: May 27, 2008

(65) Prior Publication Data
US 2008/0296951 A1     Dec. 4, 2008

(30) Foreign Application Priority Data

May 28, 2007 (JP) .................................. 2007-140190
May 30, 2007 (JP) .................................. 2007-143658

(51) Int. Cl.
*B60N 2/64* (2006.01)
*B60N 2/20* (2006.01)
*A47C 31/00* (2006.01)

(52) U.S. Cl. .............. 297/463.1; 297/378.13; 296/65.16

(58) Field of Classification Search ............. 297/378.13, 297/463.1; 296/65.09, 65.05, 65.16, 65.17
See application file for complete search history.

(56) References Cited

U.S. PATENT DOCUMENTS

| | | | | |
|---|---|---|---|---|
| 5,713,634 A * | 2/1998 | Koike | ....................... | 297/378.13 |
| 5,879,043 A * | 3/1999 | Radue et al. | ................ | 296/65.17 |
| 6,132,000 A * | 10/2000 | Tanaka | ..................... | 297/378.13 |
| 6,302,484 B1 | 10/2001 | Araki et al. | | |
| RE39,315 E * | 10/2006 | Kamida et al. | .................. | 296/63 |
| 7,201,425 B2 * | 4/2007 | Tsujibayashi et al. | ...... | 296/65.09 |

FOREIGN PATENT DOCUMENTS

JP      A-11-0348626     12/1999

* cited by examiner

*Primary Examiner* — David Dunn
*Assistant Examiner* — Tania Abraham
(74) *Attorney, Agent, or Firm* — Oliff & Berridge, PLC

(57) ABSTRACT

The present invention provides a seat apparatus having: a seat back; a forward tilt device that allows at least a portion of the seat back to tilt forward; a securing device that secures the seat back at a vehicle body side; and a release strap that is used for releasing a securing condition of the securing device and has a grip portion. The release strap has a first condition in which the grip portion is positioned at a rear side of the seat back and a second condition in which the grip portion is positioned at a portion so as to be accessible from a front side of the seat back, and one of the first condition and the second condition of the release strap can be selected.

1 Claim, 9 Drawing Sheets

SEAT APPARATUS AND VEHICLE

BACKGROUND OF THE INVENTION

1. Field of the Invention

The present invention relates to a construction in which a seat back can be tilted forward in a vehicle (for example, a car). In particular, the present invention relates to a structure that releases a lock of a locking mechanism that regulates the forward tilt.

2. Description of Related Art

Among seat backs (for example, rear seat backs) having a rear side at which a luggage compartment (trunk) is provided, there is a seat back in which the rear seat back can be tilted forward. For example, a piece of luggage (for example, skis), which has a size larger than a luggage compartment formed at a rear portion of vehicle body, can be provided in the luggage compartment by forward tilt of the rear seat back. In order to ensure safety, in a normal condition (that is, a condition in which the seat back is raised), the structure for forward tilt of the rear seat back is locked by a locking mechanism, so that the rear seat back cannot be tilted forward, and the rear seat back can be tilted forward by a lock release operation.

For example, Japanese Unexamined Patent Application Publication No. 11-348626 has proposed a construction in which the lock release operation can be performed from both a luggage compartment side and a vehicle interior side. In this construction, the rear seat back can be tilted forward by the lock release operation from both the luggage compartment side and the vehicle interior side.

The construction, in which the lock release operation can be performed from both the luggage compartment side and the vehicle interior side, is highly convenient. However, users may perceive that this construction is undesirable from the viewpoint of security. That is, for example, when a user gives a key to a parking attendant at a parking lot, if a rear seat back can be easily tilted forward, access from a vehicle interior side to a luggage compartment side can be easily performed, and a user may be anxious about such a situation. For example, when someone breaks into a vehicle, a lock release operation is performed from the vehicle interior side, a piece of luggage in a luggage compartment side may be stolen. Therefore, a construction is desired in which a lock release of the forward tilt mechanism of the rear seat back can be also performed from the vehicle interior side and the lock release of forward tilt mechanism from the vehicle interior side can be prevented by appropriately setting by user (that is, the lock release can be allowed only from the luggage compartment side by appropriately setting by user).

In the construction proposed by Japanese Unexamined Patent Application Publication No. 11-348626, lock release can be performed from the vehicle interior side, and the forward tilt of the rear seat back can be performed, so that the above requirements cannot be satisfied. In order to satisfy the above requirements, when the lock release is performed from the luggage compartment side, an operation using a password or a key may be necessary. However, this construction is complicated, the cost is thereby increased, and the operability is deteriorated (the lock release operation is troublesome).

SUMMARY OF THE INVENTION

An object of the present invention is to provide techniques that allow selecting of a condition, in which lock release of a locking mechanism from a vehicle interior side is prevented, by a very simple mechanism in a construction in which the lock release can be performed from a luggage compartment side or the vehicle interior side.

According to one aspect of the present invention, a seat apparatus has: a seat back; a forward tilt device that enables at least a portion of the seat back to tilt forward; a securing device that secures the seat back at a vehicle body side; and a release strap that is used for releasing a securing condition of the securing device and has a grip portion. The release strap has a first condition in which the grip portion is positioned at a rear side of the seat back and a second condition in which the grip portion is positioned at a portion so as to be accessible from a front side of the seat back, and one of the first condition and the second condition of the release strap can be selected.

In the first aspect of the present invention, the grip portion of the release strap can be positioned at a front side (for example, a vehicle interior side) or a rear side (for example, a luggage compartment side). It can be selected whether the grip portion of the release strap, which is gripped by hand, is positioned at the front side (for example, vehicle interior side) or the rear side (for example, luggage compartment side). Thus, when the grip portion of the release strap is positioned at the vehicle interior side, the forward tilt of the seat back can be performed from the vehicle interior side. When the grip portion of the release strap is positioned at the luggage compartment side, the forward tilt of the seat back can be performed from the luggage compartment side. The grip portion may be a portion for operating the release strap by hand. For example, the grip portion may be a portion gripped by hand, a portion gripped by finger, or a portion hooked by a finger.

In particular, when the first aspect of the present invention is applied to a construction in which the vehicle interior and the luggage compartment are separated by a plate or the like, the grip portion of the release strap is positioned at the luggage compartment side, so that the forward tilt of the seat back cannot be performed from the vehicle interior side. Thus, although the forward tilt of the seat back can be performed from the vehicle interior side, according to the selection of the user, the forward tilt cannot be performed from the vehicle interior side.

In the first aspect of the present invention, the condition, in which the release strap is disposed so as not to be accessible by reaching with one's arm from the vehicle interior side, can be selected, so that the forward tilt of the seat back cannot be performed from the vehicle interior side. The condition, in which the release strap is disposed so as to be accessible by one's arm from the vehicle interior side, can be selected, so that the forward tilt of the seat back can be performed from the vehicle interior side. This function can be realized by a simple construction and at low cost. The user can appropriately select one of the two conditions by a simple operation, and this is very convenient. Since a complicated construction is unnecessary, high durability and high reliability can be ensured. Since troublesome operations are unnecessary in the forward tilt of the seat back, the operability is enhanced.

According to a first preferred embodiment of the first aspect of the present invention, the seat apparatus further has: a release strap securing device that projects the release strap from a rear surface of the seat back toward a vehicle interior side, at which the seat back is provided, and secures the release strap at the vehicle interior side.

In the first preferred embodiment of the first aspect of the present invention, since the release strap is secured so as to project toward the vehicle interior side, the operability in the forward tilt of the seat back from the vehicle interior can be improved. The setting for the operation of the forward tilt from the vehicle interior can be reliably performed. The release strap securing device may be a securing structure in which the release strap is passed through a guide member, a surface fastener, a bottom, a hook, or a securing structure using another appropriate engagement securing member.

According to a second preferred embodiment of the first aspect of the present invention, the grip portion has a ring-shape that is provided such that an end portion of a belt-like member is folded and the folded portion is secured by the belt-like member such that a surplus portion of the folded portion is remained at the end portion, the release strap securing device can form a gap which the release strap passes through, the release strap passes through the gap, and the surplus portion is engaged with the release strap securing device, so that the release strap is secured.

In the second preferred embodiment of the first aspect of the present invention, the end portion may be folded, the ring-shape may be thereby formed, and the surplus portion may be allowed to remain. By this simple structure, the second condition of the first aspect of the present invention can be reliably provided. The portion of the ring-shape can be used as a portion gripped by hand in a lock release operation, and the operability in the lock release operation can be improved.

According to a third preferred embodiment of the first aspect of the present invention, a surface fastener for securing the release strap to the seat back is provided at the release strap. In the third embodiment of the first aspect of the present invention, when the first condition of the first aspect of the present invention is selected, the release strap can be secured at the rear surface of the seat back.

According to a forth preferred embodiment of the first aspect of the present invention (hereinafter referred to as the "second aspect of the present invention"), the seat apparatus further has: a guide device which enables the release strap to bend at at least two portions on a path in which the release strap is pulled from the securing device.

In the second aspect of the present invention, the release strap may be bent at at least two steps when the release strap is pulled from the securing device. Therefore, even when the pull angle of the release strap with respect to the seat back is changed, the change and increase of frictional resistance can be inhibited. Thus, the operability of release of the securing device by the pulling of the release strap may not depend on the pull angle of the release strap, and large differences in the operability of the release of the securing device will not occur. That is, even when the release strap is pulled rearward or upward, the increase of frictional resistance on the guide portion can be inhibited, and the deterioration of the operability can be prevented. Therefore, the operation sensation can be good. Since the increase of frictional force between the release strap and the guide device can be inhibited, the load on the release strap and the guide device can be suppressed. As a result, the durability and the reliability of the release strap and the guide device can be improved.

According to a first preferred embodiment of the second aspect of the present invention, the release strap is pulled rearward by the guide device after being pulled downward from the securing device, and the bend portions of the release strap on the guide device have an angle that exceeds approximately 90 degrees.

In the first preferred embodiment of the second aspect of the present invention, even in the case in which the release strap is pulled upward, since the release strap is bent at at least the two portions when the release strap is pulled out, the bend angle of the release strap may exceed approximately 90 degrees, and frictional resistance on the bend portion cannot be large. The front side may be defined as a front direction of the seat apparatus, and the rear side may be defined as a rear direction of the seat apparatus. The angle of the bend portion may be defined as an angle of the bend portion formed on the guide device.

According to a second preferred embodiment of the second aspect of the present invention, the seat back is tilted rearward, and the guide device has: a first guide portion that bends the release strap rearward at a lower side of the securing device; and a second guide portion that regulates the release strap from an upper side at a rear side of the first guide portion. The release strap extends from the securing device to an oblique lower rear side and reaches the first guide portion.

In the second preferred embodiment of the second aspect of the present invention, when the release strap is pulled from the above, the release strap may be pulled along the rear surface of the tilted seat back. Therefore, even when the release strap is operated from the vehicle interior side, the bend angle of the release strap on the second guide portion can be an obtuse angle exceeding approximately 90 degrees. Since the extending direction of the release strap extending from the securing device to the first guide portion is rearward from the vertical direction, the bend angle of the release strap on the first guide portion can be obtuse without being dependent on the operation condition. Thus, in the operation of the release strap from the vehicle interior side and the luggage compartment side, the bend angle of the release strap on the guide device can be exceed 90 degrees.

According to a preferred embodiment of the present invention, the seat back is a rear seat back that has a rear side at which a luggage compartment is provided, and in the first condition, the release cannot be performed from a vehicle interior side at which the rear seat back is provided. In this embodiment, in the construction in which the user can select one of one feature (first condition) in which the forward tilt of the rear seat back cannot be performed from the vehicle interior side and another feature (second condition) in which the forward tilt of the rear seat back can be performed from the vehicle interior side, even when the first condition and the second condition are selected, large difference of the operation feeling of the release strap cannot be generated. Even when the first condition and the second condition are selected, load on the release strap and the guide device cannot be excessive.

The feature in which the forward tilt of the rear seat back cannot be performed from the vehicle interior side can be selected, so that the forward tilt of the rear seat back by a person with criminal intent from the vehicle interior can be prevented, and theft of valuables by a person with criminal intent in the luggage compartment can be prevented. Since the feature in which the forward tilt of the rear seat back can be also performed from the vehicle interior side can be selected by the user, the convenience can be set according to the desire of the user.

According to a third aspect of the present invention, a vehicle has the seat apparatus of the above aspects and the above preferred embodiments of the present invention. The vehicle may be a car, a luggage transportation vehicle, or the like.

According to the first aspect or the third aspect of the present invention, in the construction in which the locking mechanism for prevention of forward tilt of the seat back can be released from the vehicle interior side or from the luggage compartment side, by a device that is as simple as possible, the release of the locking mechanism can be prevented from the vehicle interior side.

In particular, according to the second aspect of the present invention, in the construction in which the locking mechanism for prevention of forward tilt of the seat back can be released from the vehicle interior side or from the luggage compartment side, by the very structure which is as simple as possible, the force applied to the release strap and the guide device can be reduced, and the operability, reliability, and durability can be superior.

BRIEF DESCRIPTION OF THE DRAWINGS

FIG. 1A is a schematic side view of the rear seat apparatus, and FIGS. 1B to 1D are schematic rear side views of the rear seat apparatus.

FIG. 7A is a schematic side view of the rear seat apparatus, and FIGS. 7B to 7D are schematic rear side views of the rear seat apparatus.

DESCRIPTION OF THE PREFERRED EMBODIMENTS

1. First Embodiment

Construction of Rear Seat Apparatus

Figure 1A:
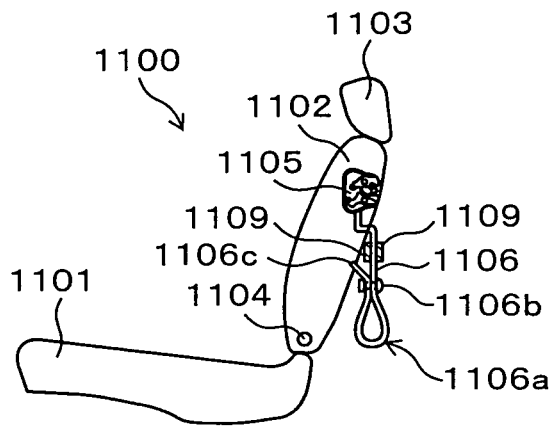
FIGS. 1A to 1D are schematic views showing a rear seat apparatus according to a first aspect of the present invention.

FIGS. 1A to 1D are conceptual schematic diagrams showing one example of a rear seat apparatus according to first aspect of the present invention. FIG. 1A is a conceptual diagram showing a rear seat apparatus 1100 seen from a side surface thereof. The rear seat apparatus 1100 is equipped with a rear seat cushion 1101, a rear seat back 1102, a rear seat head rest 1103, a forward tilt device 1104, and a lock device 1105. In FIGS. 1A to 1D, description of a seat belt is omitted.

The rear seat cushion 1101 is a sitting cushion and is secured to a vehicle body (not shown in FIGS. 1A to 1D). The rear seat back 1102 corresponds to a backrest. The rear seat head rest 1103 is secured at an upper portion of the rear seat back 1102, and it supports a head of sitting user from a rear side thereof. The forward tilt device 1104 has a rotational shaft, and it enables the rear seat back 1102 to tilt forward with respect to the rear seat cushion 1101 around the rotational shaft. That is, one end of the rotational shaft 1104 is secured to a vehicle body side (not shown in FIGS. 1A to 1D) or the rear seat back 1102, and the other end of the rotational shaft 1104 is rotatably secured to the rear seat back 1102 or the vehicle body side (not shown in FIGS. 1A to 1D).

The lock device 1105 is disposed in the rear seat back 1102. The lock device 1105 regulates the forward tilt of the rear seat back 1102 from a raised condition thereof (shown in FIG. 1A). That is, in a normal operation method, the forward tilt of the rear seat back 1102 cannot be performed by the lock device 1105. The lock condition of the lock device 1105 is released by the pulling of a release strap 1106. That is, the release strap 1106 is pulled by hand, the lock condition in which the raised condition of the rear seat back 1102 is secured is released, and the rear seat back 1102 can be tilted forward by hand. When the release strap 1106 is not pulled by hand, the lock condition in which the raised condition of the rear seat back 1102 is secured is maintained, by normal force (in a normal method), the rear seat back 1102 cannot be tilted forward by hand. The details of the lock device 1105 will be described hereinafter.

The release strap 1106 is obtained such that a woven synthetic fiber is formed to have a belt-like shape. The release strap 1106 is flexible and has a ring shape 1106a obtained such that an end portion of the woven synthetic fiber is folded. That is, the end portion of the release strap 1106 is folded, a portion that is a few centimeters away from the end portion is overlapped with the body of the release strap 1106, and the overlapped portion is secured by a pin 1106b. In this structure, a portion of the ring shape 1106a and a surplus portion extending in the folded direction are formed.

The portion of the ring shape 1106a functions as a grip portion. The release operability can be increased by gripping the portion of the ring shape 1106a by hand. As described hereinafter, the release strap 1106 can be secured to the rear surface of the rear seat back 1102 by using the above folded portion. When the end portion of the release strap 1106 is folded and the ring shape 1106a is formed, the substantial end portion of the release strap 1106 is the portion of the ring shape 1106a.

A surface fastener 1109 is disposed on both surfaces of the portion of the release strap 1106 that is secured by the pin 1106b and is proximate to the lock device 1105. The release strap 1106 can be secured by the surface fastener 1109 at a freely selected position (or a predetermined position) on the rear surface of the rear seat back 1102

The shape and the material, etc., are not limited to those described above. For example, the release strap 1106 can use a cord, a material having some rigidity, or a multiple joint structure. The grip portion can use another member for a handle portion or a finger hook portion that corresponds to the portion handled by hand.

An opening 1107 is provided on the rear surface of the rear seat back 1102. The other end portion of the release strap 1106 is connected to the lock device 1105 via the opening 1107. A release strap securing device 1108 is disposed on the rear surface of the rear seat back 1102. The release strap securing device 1108 has a structure such that both ends of a belt-like member (for example, the same member as the release strap 1106) are secured to the rear surface of the rear seat back 1102 by sewing or using an appropriate mounting member. The release strap 1106 is passed through a portion of the release strap securing device 1108 that is not secured, so that the release strap 1106 is secured to the rear surface of the rear seat back 1102 by the release strap securing device 1108.

Figure 1B:
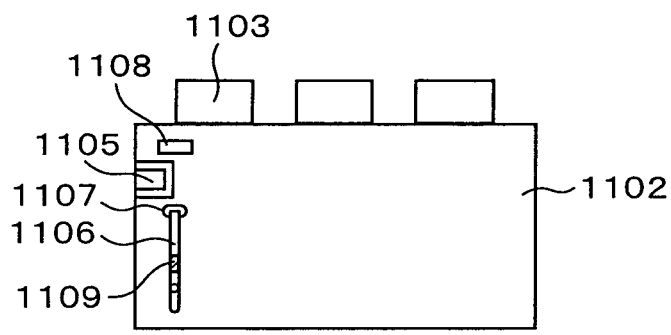
Figure 1C:
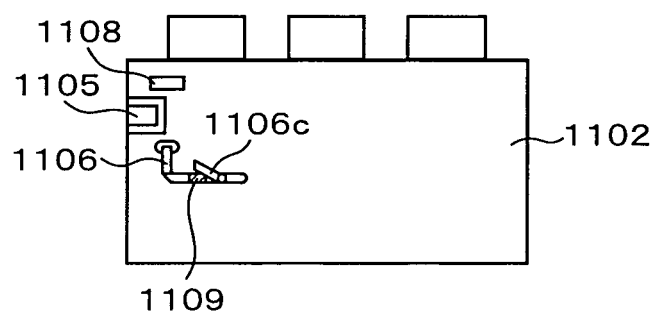

As shown in FIG. 1B, the release strap 1106 is not passed through the release strap securing device 1108, and it hangs down. In this case, instead of simply hanging down, by using the surface fastener 1109, the release strap 1106 can be secured to a flat surface of the rear seat back 1102. The secured position of the release strap 1106 can be freely selected. FIG. 1C shows one example in which the release strap 1106 is folded in the right direction seen from the side of the rear surface of the rear seat back 1102, and the release strap 1106 is secured to the rear surface of the rear seat back 1102 by using the surface fastener 1109. In this manner, since the release strap 1106 can be secured at a freely selected position of the rear surface of the rear seat back 1102, the release of the lock condition from a luggage compartment becomes highly convenient.

Figure 1D:
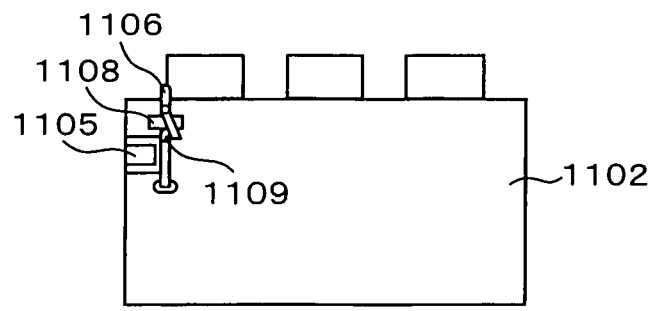

As shown in FIG. 1D, the release strap 1106 is passed upward through the release strap securing device 1108, and the leading end (in this case, the portion of the ring shape 1106*a*) projects upward from the upper end portion of the rear seat back 1102. In this condition, the release strap 1106 is secured to the release strap securing device 1108 so as not to move downward. This securing mechanism will be explained hereinafter.

Figure 2A:
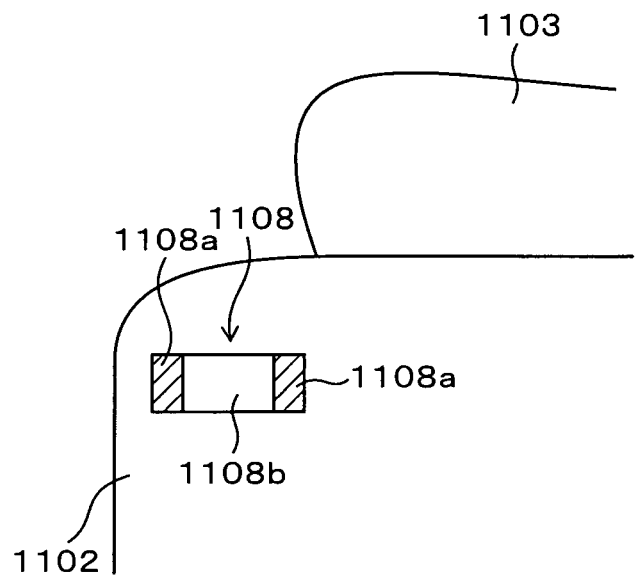
FIGS. 2A and 2B are conceptual diagrams showing one example of a release strap securing device and a portion of a ring shape of a release strap.
Figure 2B:
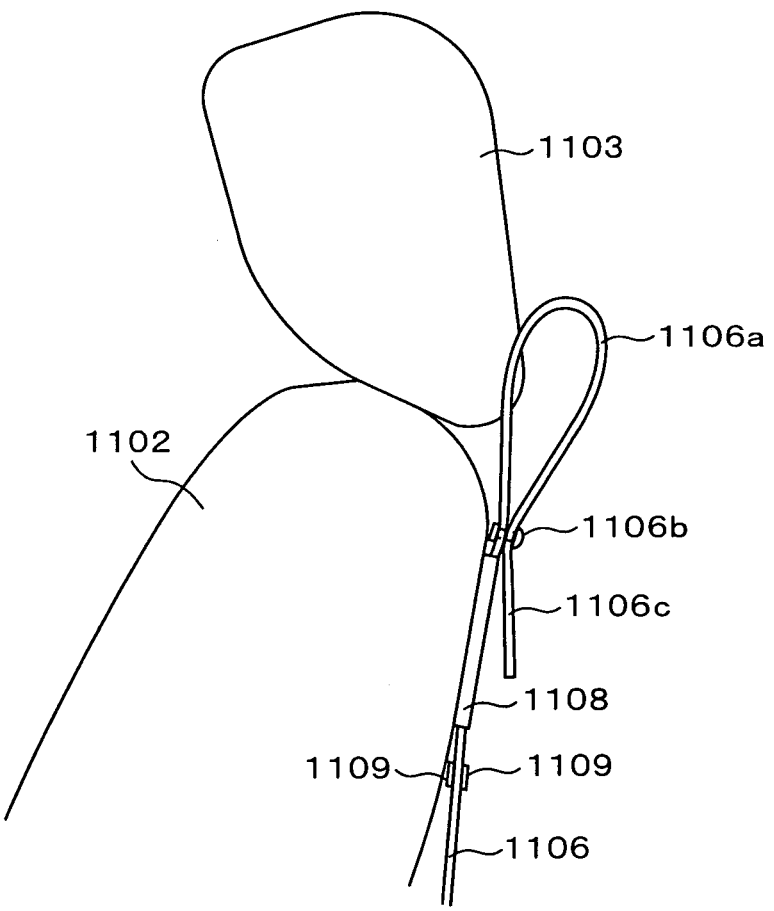

FIG. 2A shows one example of the release strap securing device 1108, and FIG. 2B shows one secured example of release strap 1106 secured to the release strap securing device 1108. In the example shown in FIG. 2A, the release strap securing device 1108 is constructed in such a way that the same member as the release strap is cut so as to have a length of a few centimeters and both ends 1108*a* thereof are secured by sewing to the rear seat back 1102. A portion 1108*b* between the sewn portions 1108*a* is not secured to the rear seat back 1102, and a gap that the release strap 1106 is passed through can be formed thereat.

In the example shown in FIG. 2B, the portion of the ring shape 1106*a* of the release strap 1106 is passed through the gap, formed by the release strap securing device 1108, from the lower side. The surplus portion 1106*c*, which is a leading end portion of folded the portion, is pulled to the outside of the release strap securing device 1108, and it is hung at the gap portion from above and is held thereat. In this case, since the surplus portion 1106*c* is hung at the gap portion from above and is held thereat, the release strap 1106 is secured to the rear surface of the rear seat back 1102 so as not to move downward.

As shown in FIG. 1D, the release strap securing device 1108 prevents the release strap 1106 from overlapping with the lock device 1105. The release strap 1106 is not overlapped with the lock device 1105, so that when the rear seat back 1102 is raised, and the raised condition of the rear seat back 1102 is locked by the lock device 1105, the release strap 1106 can be prevented from being caught by the lock device 1105.

Car with Rear Seat Apparatus

Figure 3:
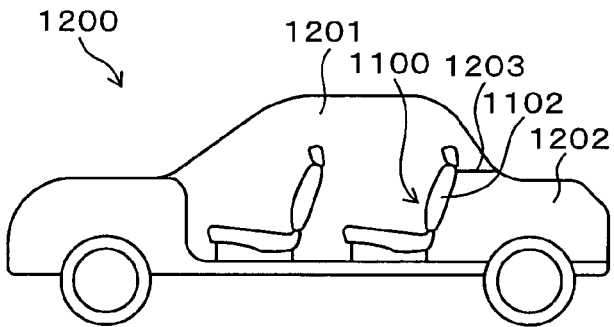
FIG. 3 is a conceptual diagram showing a car having a rear seat apparatus according to a first aspect of the present invention.

FIG. 3 is a conceptual diagram showing one example of a car having the rear seat apparatus 1100 shown in FIGS. 1A to 1D. In FIG. 3, a car 1200 is shown. The car 1200 is equipped with a vehicle interior (passenger compartment) 1201 and a luggage compartment (rear section trunk) 1202. In the condition (shown in FIG. 3) in which the rear seat back 1102 is raised, the rear surface of the rear seat back 1102 contacts a rear board 1203, and the vehicle interior 1201 and the luggage compartment 1202 are separated.

Lock Device

One example of the lock device 1105 shown in FIGS. 1A to 1D will be explained hereinafter. FIGS. 4A to 4D are conceptual action diagrams showing one example of the lock device 1105. As shown in FIGS. 4A to 4D, the lock device 1105 shown in FIG. 1A is schematically enlarged. The lock device 1105 is secured in the rear seat back 1102 shown in FIGS. 1A to 1D, and it is constructed such that rotational engagement members 1302 and 1303 are rotatably secured in a base casing 1301. The rotational engagement member 1302 is rotatable around a shaft 1302*a*, and the rotational engagement member 1303 is rotatable around a shaft 1303*a*.

Figure 4A:
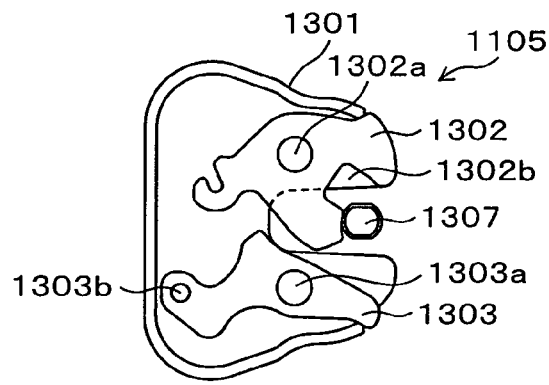
FIGS. 4A to 4D are conceptual schematic diagrams showing actions of a locking apparatus.
Figure 4B:
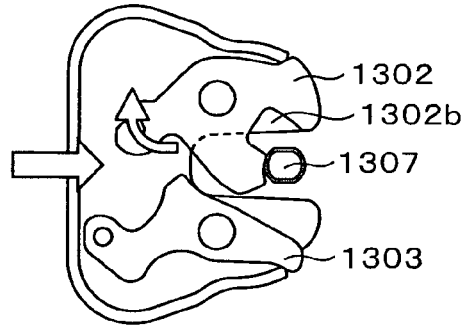
Figure 4C:
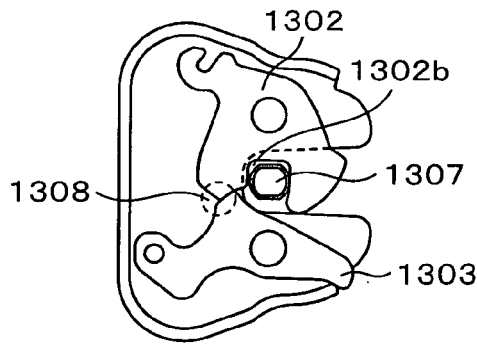
Figure 4D:
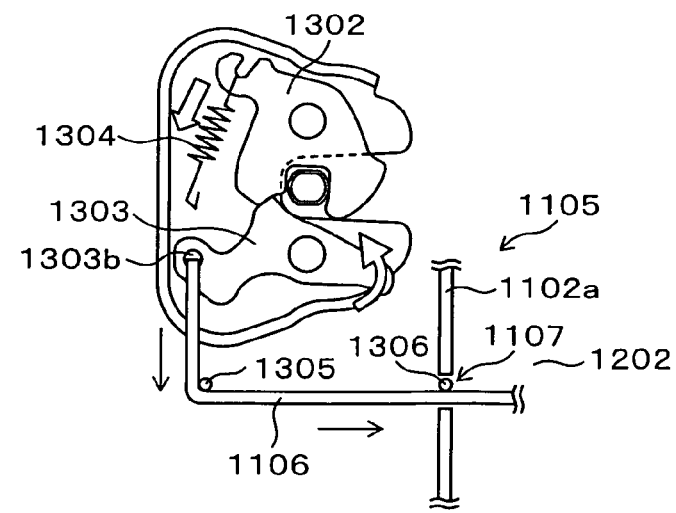

As shown in FIG. 4D, the rotational engagement member 1302 is pulled and biased by a spring 1304 in a counterclockwise direction. The end of the release strap 1106 is secured to a portion 1303*b* of the rotational engagement member 1303. The direction of the release strap 1106 is changed to the right direction in the Figure by a rod-like guide 1305 having a circular cross section. The release strap 1106 extends from the opening 1107 (also see FIGS. 1A to 1D) to the inner space of the luggage compartment 1202 (also see FIG. 3) such that the upper surface of the release strap 1106 contacts (or is proximate to) a guide 1306 having the same cross section structure as that of the guide 1305.

Reference numeral 1102*a* denotes a member covering the rear surface of the rear seat back 1102 shown in FIGS. 1A to 1D. Reference numeral 1307 denotes a vehicle side striker secured to a vehicle frame (frame structure of vehicle) of the car 1200 shown in FIG. 3. The vehicle side striker 1307 has a ring shape obtained by the working of a rod-like member.

One example of the action of the lock device 1105 will be explained hereinafter with reference to FIGS. 4A to 4D. The rear seat back 1102 (see FIGS. 1A to 1D and FIG. 3) is raised rearward from the forward tilt condition, and the lock device 1105 is moved relatively close to the vehicle side striker 1307. In this case, the rotational engagement member 1302 is biased in a counterclockwise direction, thereby being in the condition shown in FIG. 4A.

When the raising action of the rear seat back 1102 (see FIGS. 1A to 1D and 3) reaches a predetermined step, as shown in FIG. 4A, the vehicle side striker 1307 contacts the rotational engagement member 1302. When the rear seat back 1102 is further raised from this condition, the rotational engagement member 1302 rotates against the biased force in a clockwise direction (in FIG. 4B). When the rotational engagement members 1302 and 1303 are engaged with each other at a portion 1308, the rotational engagement member 1302 cannot further rotate in a clockwise direction, and the rear seat back 1102 cannot be further raised (in FIG. 4C).

When the condition shown in FIG. 4C is reached, the raising action of the rear back seat 1102 which was forward tilted is completed. In the condition shown in FIG. 4C, the vehicle side striker 1307 is fitted into a recess 1302*b* of the rotational engagement member 1302. In this condition shown in FIG. 4C, since the rotational engagement members 1302 and 1303 are engaged with each other at the portion 1308, the rotational engagement member 1302 cannot rotate in a counterclockwise direction in the Figure. Therefore, the rear seat back 1102 cannot be tilted forward from the condition shown in the FIG. 4C. That is, the lock device 1105 cannot be moved in the left direction in the Figure. Thus, in the raised condition of the rear seat back 1102 (see FIGS. 1A to 1D and 3), the rear seat back 1102 is secured (locked). This is a lock function of the lock device 1105.

In order to release the lock condition of the lock device 1105 shown in FIG. 4C, the release strap 1106 may be pulled from the side of the luggage compartment 1202. In this case, the rotational engagement member 1303 rotates in a counterclockwise direction in the Figure, and the engagement condition (shown in FIG. 4C) of the rotational engagement members 1302 and 1303 is released. The rotational engagement member 1302 rotates by the biased force of the spring 1304 in a counterclockwise direction in the Figure. When the rear seat back 1102 (shown in FIGS. 1A to 1D and 3) is tilted forward, the action shown in FIG. 4B is performed, and the action shown in FIG. 4A is then performed. The vehicle side striker 1307 held by the lock device 1105 is released from the lock device 1105, and the lock device 1105 can be relatively moved in the left direction in the Figure. That is, the rear seat back 1102 can be tilted forward. Thus, by pulling the release strap 1106 from the side of the luggage compartment 1202, the lock condition of the rear seat back 1102 by the lock device 1105 is released, and the forward tilt of the rear seat back 1102 can be performed.

Arrangement Condition and Operation Example of Release Strap

The release strap 1106 has a first condition in which the leading end portion (the portion of the ring shape 1106a) of the release strap 1106 is positioned at the side of the luggage compartment 1202 (shown in FIG. 3) and a second condition in which the leading end portion (the portion of the ring shape 1106a) of the release strap 1106 is positioned so as to be accessible from the front side of the rear seat back 1102. The first condition or the second condition of the release strap 1106 can be selected. This will be explained hereinafter.

One example of the first condition is shown in FIGS. 1B and 1C. In this case, the leading end portion (in this case, the portion of the ring shape 1106a) of the release strap 1106 is positioned at the rear surface side of the rear seat back 1102. In this condition, when the rear seat back 1102 is raised, the above lock of the rear seat back 1102 by the lock device 1105 is performed, and the leading end portion of the release strap 1106 is positioned in the luggage compartment 1202 (shown in FIG. 3). In this condition, the operation of the release strap 1106 cannot be performed from the side of the vehicle interior 1201. That is, when the rear seat back 1102 is raised, the rear surface of the rear seat back 1102 contacts the rear board 1203 (shown in FIG. 3), and the access from the side of the vehicle interior 1201 to the luggage compartment 1202 cannot be performed. Therefore, when the rear seat back 1102 is raised, the operation of the release strap 1106 in the condition shown in FIG. 1B or 1C cannot be performed. In this case, by operating the release strap 1106 from the side of the luggage compartment 1202, the forward tilt of the rear seat back 1102 can be performed.

One example of the above second condition is shown in FIG. 1D. In this case, the leading end portion (the portion of the ring shape 1106a) of the release strap 1106 is positioned so as to project upward from the rear surface side of the rear seat back 1102. In this condition, when the rear seat back 1102 is raised, and the above lock of the rear seat back 1102 by the lock device 1105 is performed, the leading end portion of the release strap 1106 is held between the rear surface of the rear seat back 1102 and the rear board 1203 (shown in FIG. 3). The leading end portion of the release strap 1106 is positioned in the vehicle interior 1201 (also see FIG. 2B). This second condition is secured by the mechanism shown in FIG. 2B. In this condition, the operation of the release strap 1106 from the side of the vehicle interior 1201 can be performed.

In the operation of the release strap 1106 from the side of the vehicle interior 1201, the release strap 1106 is pulled upward from the opening 1107 (shown in FIG. 1B). In this case, by the guides 1305 and 1306 shown in FIG. 4D, the bent condition of the release strap 1106 is divided into two parts, and the bent condition does not have an acute angle. That is, the angle of the bent condition exceeds 90 degrees. Therefore, when the release strap 1106 is pulled from the side of the vehicle interior 2201 (shown in FIG. 11) in the condition shown in FIG. 4D, it is unnecessary that the pull force be very large. That is, on the side of the luggage compartment 1202, a large difference in pulling pressure between the pulling in the right direction and the pulling in the upper direction will not occur. As a result, the operability of the release strap 1106 can be improved.

Advantages of Embodiment

In the above first embodiment, when the leading end portion of the release strap 1106 is set at the position shown in FIG. 1B or 1C, the release of the lock condition, in which the forward tilt of the rear seat back 1102 cannot be performed, cannot be performed from the side of the vehicle interior 1201 (that is, it can be performed only from the side of the luggage compartment 1202). When the leading end portion of the release strap 1106 is positioned at the position shown in FIG. 1D, the release of the lock condition, in which the forward tilt of the rear seat back 1102 cannot be performed, can be performed from the side of the vehicle interior 1201. In this manner, one of the above settings for the release of the lock condition can be appropriately selected by the position of the leading end portion of the release strap 1106. In particular, this construction does not require a structure incurring increased cost, and cost reduction can be realized. As shown in FIG. 2B, downward movement of the release strap 1106 from the condition shown in FIG. 1D or 2B can be prevented by the simple construction. Therefore, even though the construction does not incur an increase in cost, the condition in which the rear seat back 1102 can be tilted forward from the vehicle interior 1201 can be reliably maintained.

2. Second Embodiment

Figure 5:
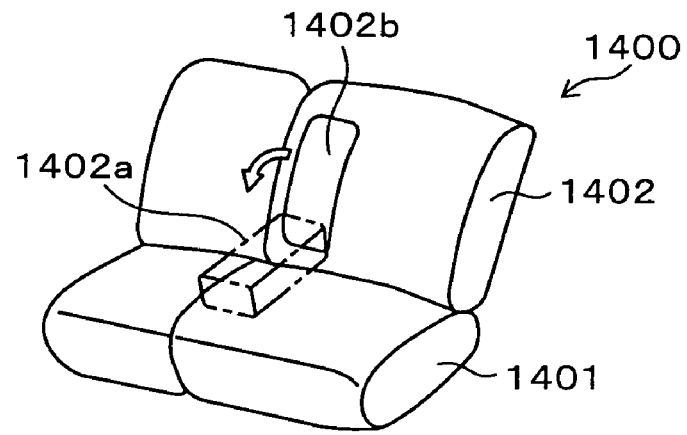
FIG. 5 is a schematic perspective view showing a rear seat apparatus using the present invention.

The first aspect of the present invention can be applied to a construction in which a portion of the rear seat back can be tilted forward. FIG. 5 is a perspective view that schematically shows another example of the rear seat apparatus. A rear seat apparatus 1400 is shown in FIG. 5. The rear seat apparatus 1400 is equipped with a rear seat cushion 1401 and a rear seat back 1402. A portion 1402a of the rear seat back 1402 can be tilted forward, and an opening 1402b is formed by forward tilt of the portion 1402a. The portion 1402a communicates with the luggage compartment (not shown in FIG. 5) on the rear side of the rear seat back 1402. In this construction, the portion 1402a of the rear seat back 1402 is tilted forward, so that an elongated piece of luggage that does not fit into the luggage compartment (not shown in FIG. 5) can be disposed in the luggage compartment by allowing a portion of the piece of luggage to protrude into the vehicle interior side.

In a feature shown in FIG. 5, a lock device (not shown in FIG. 5) which regulates forward tilt of the portion 1402a of the rear seat back 1402 is provided in the rear seat back 1402. This mechanism of the lock device can use the mechanism shown in FIGS. 4A to 4D. That is, the lock device shown in FIGS. 4A to 4D is provided in the rear seat back 1402, and a striker (not shown in the FIG. 5) is provided in the portion 1402a of the rear seat back 1402. The actions shown in FIGS. 4A to 4D are performed, so that the portion 1402a of the rear seat back 1402 is secured (locked), and the lock thereof is released.

In this construction, a release strap (not shown in FIG. 5) which performs an operation for releasing the lock condition of the above lock device is pulled from the rear surface side of the rear seat back 1402 in the same manner as in FIGS. 1A to 1D. The release strap can be set in one condition, in which the leading end portion of the release strap is positioned at the rear seat back 1402, or be set in another condition, in which the release strap is held between the rear seat back 1402 and the portion 1402a and the leading end portion thereof is projected toward the side of the vehicle interior. In this feature, the leading end portion of the release strap is positioned at the luggage compartment side (in the luggage compartment), so that forward tilt of the portion 1402a cannot be performed from the vehicle interior side.

3. Third Embodiment

Figure 6:
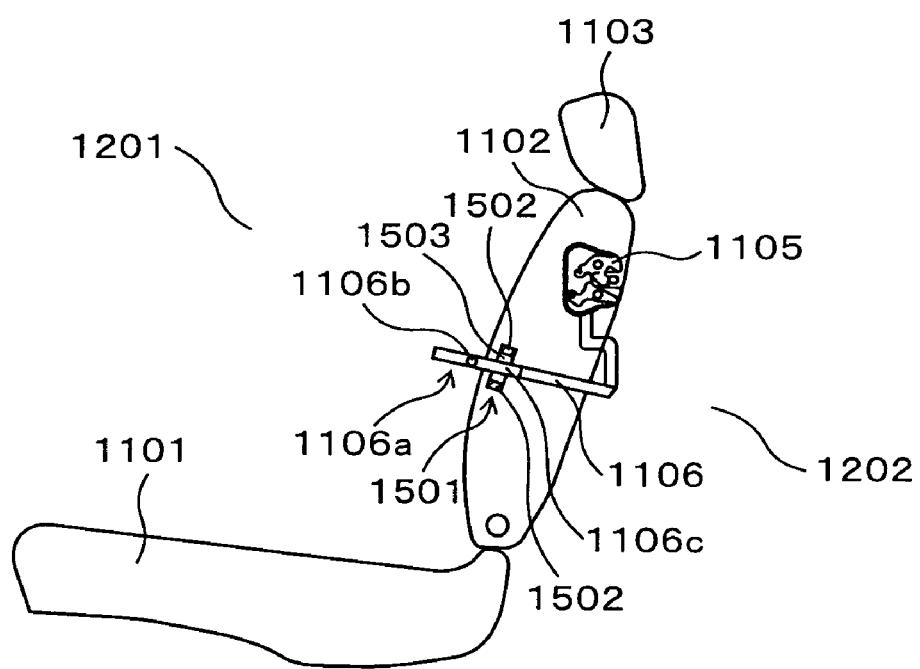
FIG. 6 is a conceptual schematic view showing another rear seat apparatus.

The release strap 1106 can be protruded from the side portion of the rear seat back 1102 to the vehicle interior 1201. FIG. 6 is a conceptual diagram showing one example in which the release strap 1106 is protruded from the side portion of the rear seat back 1102 to the vehicle interior 1201. In FIG. 6, the portion of the ring shape 1106a of the release strap 1106 is protruded from the side portion of the rear seat back 1102 to the vehicle interior 1201.

In this example, the release strap 1106 has the same structure as that shown in FIG. 1A. A release strap securing device 1501 is disposed at the side surface of the rear seat back 1102. The release strap securing device 1501 is positioned at the lower side of the lock device 1105. The release strap securing device 1501 is structured such that the same member as the release strap is cut so as to have a length of a few centimeters, and both ends 1502 are secured by sewing to the side surface of the rear seat back 1102. The portion 1503 between the sewn portions 1502 is not secured to the rear seat back 1102, and the release strap 1106 can be passed therethrough. As shown in FIG. 6, the release strap 1106 is passed through the portion 1503 from the rear side, and the folded surplus portion 1106c shown in FIGS. 1A and 2B is pulled to the outside of portion 1503, so that the movement of the release strap 1106 to the side of the luggage compartment 1202 is prevented.

4. Fourth Embodiment

In the first embodiment, the lock device 1105 may be disposed on the vehicle body side, and the striker may be disposed on the seat side. In this case, in the construction shown in FIGS. 4A to 4D, the striker 1307 is secured to the rear seat back 1102, and the lock device 1105 is secured to the vehicle body side. The release strap connected to the lock device on the vehicle body side is secured to the rear seat back in the first condition or the second condition of the first aspect of the present invention.

5. Modification Examples of First to Fourth Embodiments

The position at which the release strap is secured is not limited to the rear seat back. For example, when the first condition of the first aspect of the present invention is used, the release strap 1106 shown in FIGS. 1A to 1D may be secured to a freely selected inner surface (for example, a side wall surface) in the luggage compartment 1202. When the second condition of the first aspect of the present invention is used, the base portion of the ring shape 1106a of the release strap 1106 shown in FIGS. 1A to 1D may be secured to the rear board 1203 shown in FIG. 3. In this case, the release strap securing device may be disposed on the side of the rear board 1203.

Industrial Applicability

The first aspect of the present invention can be applied to a construction in which at least a portion of the rear seat back of a vehicle (for example, a car) can be tilted forward.

6. Fifth Embodiment

Construction of Rear Seat Apparatus

Figure 7A:
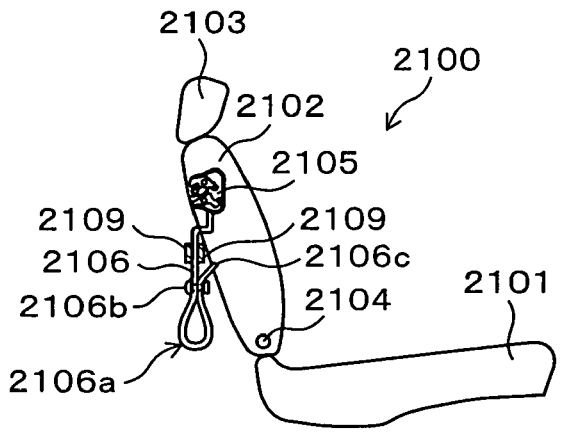
FIGS. 7A to 7D are schematic views showing a rear seat apparatus according to a second aspect of the present invention.

One example in which the second aspect of the present invention is applied to a rear seat apparatus of a car will be explained hereinafter. FIGS. 7A to 7D are conceptual diagrams showing one example of rear seat apparatus using the second aspect of the present invention. FIG. 7A is a conceptual diagram showing a rear seat apparatus 2100 seen from a side surface thereof. The rear seat apparatus 2100 is equipped with a rear seat cushion 2101, a rear seat back 2102, a rear seat head rest 2103, a forward tilt device 2104, and a lock device 2105. In FIGS. 7A to 7D, a seat belt is not shown.

The rear seat cushion 2101, the rear seat back 2102, the rear seat head rest 2103, and the forward tilt device 2104 have the same constructions as the rear seat cushion 1101, the rear seat back 1102, the rear seat head rest 1103, and the forward tilt device 1104 of the first embodiment of the first aspect of the present invention. The lock device 2105 is different from the lock device 1105 of the first embodiment of the first aspect of the present invention in construction. A release strap 2106, a ring shape 2106a, a surplus portion 2106c, an opening 2107, a release strap securing device 2108, and a surface fastener 2109 have the same constructions as the release strap 1106, the ring shape 1106a, the surplus portion 1106c, the opening 1107, the release strap securing device 1108, and the surface fastener 1109 of the first embodiment of the first aspect of the present invention. The release strap 2106, the ring shape 2106a, the surplus portion 2106c, the opening 2107, the release strap securing device 2108, and the surface fastener 2109 are different from the first embodiment of the first aspect of the present invention in the positions of the cases of the rear seat back shown in the Figure, and each position shown in the Figure is a side of the rear seat back opposite to that of the first embodiment of the first aspect of the present invention. Since this position difference is for convenience of illustration, the above members and portions may be disposed at the same positions as the cases in the first embodiment of the first aspect of the present invention. The features that are different from those of the above embodiments of the first aspect of the present invention will be mainly described in the following embodiments.

Figure 7B:
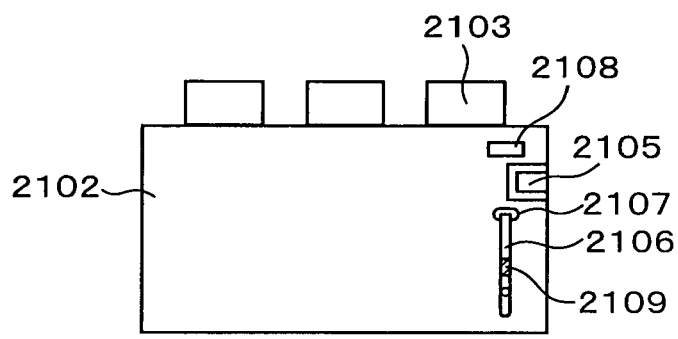
Figure 7C:
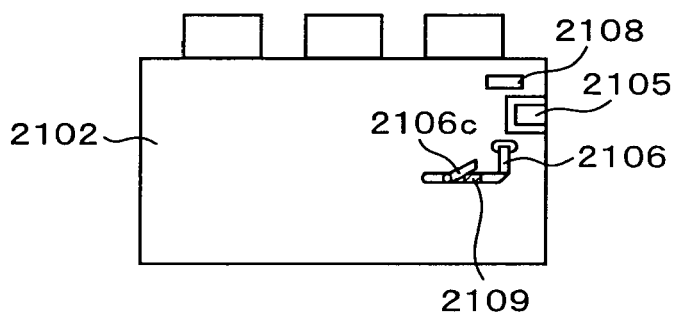
Figure 8:
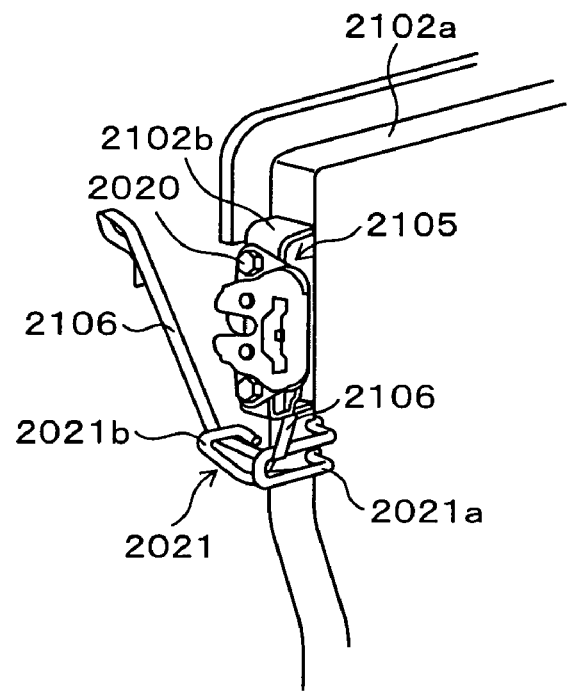
FIG. 8 is a perspective view showing one example of a release strap securing device and a guide member.
Figure 9:
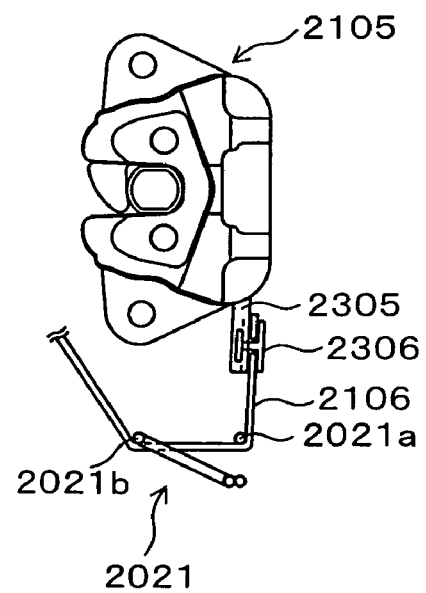
FIG. 9 is a side view showing one example of a release strap securing device and a guide member.

The opening 2107 is provided on the rear surface of the rear seat back 2102, and one end of the release strap 2106 is connected to the lock device 2105 through the opening 2107. A guide device, which enables the release strap 2106 to bend at two portions thereof, is disposed at the opening 2107. FIG. 8 is a conceptual perspective view showing one example of a lock device and a guide device. FIG. 8 shows the condition of the rear seat apparatus 2100, in which the lock device 2105 shown in FIGS. 7A to 7D is exposed to the outside, seen from the right oblique upper front side of the rear seat apparatus 2100. In FIG. 8, an exterior member or a cushion of the rear seat back is removed, and the lock device 2105 is mounted to a framework structure (rear seat back frame 2102a) of the rear seat back. FIG. 9 is a conceptual diagram showing the lock device and the guide device seen from the side direction thereof. In FIGS. 8 and 9, the rear seat back is raised.

FIG. 8 shows the rear seat back frame 2102a forming the framework structure of the rear seat back in FIG. 7. The lock device 2105 is secured by a bolt 2020 to the rear seat back frame 2102a via a mounting pedestal (bracket) 2102b. A guide device 2021 made of a rigid steel wire is secured to the rear seat back frame 2102a.

The release strap 2106 is connected to the lower portion of the lock device 2105 via a bracket (connecting fitting) 2305. The release strap 2106 and the bracket 2305 are connected to each other by caulking fitting 2306. The extending direction of the release strap 2106, which extends downward from the lower portion of the lock device 2105, is changed at two steps by the guide device 2021. That is, the release strap 2106 is bent at two portions thereof by the guide device 2021. The release strap 2106 is pulled to the rear side of the rear seat back frame 2102a (rear seat back 2102 shown in FIGS. 7A to 7D). That is, the extending direction of the release strap 2106, which is connected to the lower portion of the lock device 2105 and extends downward therefrom, is changed to the left horizontal direction of FIG. 9 by a steel wire portion 2021a which is a first guide portion of the guide device 2021. The release strap 2106 extending in the left horizontal direction of FIG. 9 contacts or is proximate to a lower portion of a steel wire portion 2021b, which is a second guide portion of the guide device 2021, and the upper surface of the release strap 2106 is regulated by the steel wire portion 2021b from the upper side. In the example shown in the Figure, the upper surface of the release strap 2106 extending from the right direction contacts the steel wire portion 2021b, and the release strap 2106 is bent thereat in the left oblique upper direction.

As shown in FIGS. 8 and 9, the positions of the steel wire portions 2021a and 2021b which are the first guide portion and the second guide portion have the same height. The extending direction of the release strap 2106 extending downward from the lock device 2105 is not a vertically lower direction but is an approximately oblique lower direction which is inclined at an angle θ rearward from the vertical direction. That is, the release strap 2106 extends from the lock device 2105 to the steel wire portion 2021a so as to be inclined at an angle θ rearward from the vertical direction. For example, the angle θ is 3 degrees. The angle θ is selected from the range of more than 0 degree and less than 10 degrees.

In this example, the release strap is bent at two positions (at two steps) by the guide device, and is limited to this case. For example, the release strap is bent at three or more positions (at three or more steps) by the guide device, and the bend angle at one position is an obtuse angle (which is closer to 180 degrees). In this manner, frictional resistance can be reduced at the contact position of the guide device and the release strap, and operability difference due to pulling angle difference of the release strap can be greatly adjusted and the load on the member can be greatly reduced.

A surface fastener, a snap bottom, and another engagement device for securing of the release strap can be used as the release strap securing device 2108. As shown in FIG. 7B, the release strap 2106 is not passed through the release strap securing device 2108, and it hangs down. In this case, instead of simply hanging down, by using the surface fastener 2109, the release strap 2106 can be secured to the rear surface of the rear seat back 2102. The secured position of the release strap 2106 can be freely selected. FIG. 7C shows one example in which the release strap 2106 is folded toward the left direction seen from the rear surface side of the rear seat back 2102, and the release strap 2106 is secured to the rear surface of the rear seat back 2102 by using the surface fastener 2109. In this manner, since the release strap 2106 can be secured at a freely selected position of the rear surface of the rear seat back 2102, the release of the lock from a luggage compartment is very convenient.

Figure 7D:
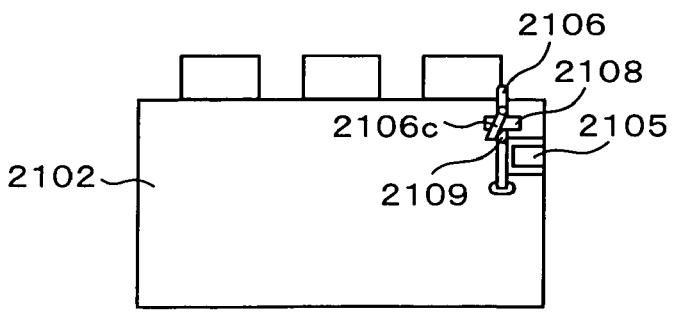

As shown in FIG. 7D, the release strap 2106 is passed upward through the release strap securing device 2108, and the leading end (in this case, the portion of the ring shape 2106a) of the release strap 2106 projects upward from the upper end portion of the rear seat back 2102. In this condition, in the release strap 2106, the surplus portion 1106c is hung at the outside of the release strap securing device 2108, and it is held thereat. Therefore, the release strap 2106 is secured to the release strap securing device 2108 so as not to move downward.

As shown in FIG. 7D, the release strap securing device 2108 prevents the release strap 2106 from overlapping with the lock device 2105. The release strap 2106 is not overlapped with the lock device 2105, so that when the rear seat back 2102 is raised, and the raised condition of the rear seat back 2102 is locked by the lock device 2105, the release strap 2106 can be prevented from being caught by the lock device 2105.

Lock Device

One example of the lock device 2105 shown in FIGS. 7A to 9 will be explained hereinafter. FIGS. 10A to 10D are conceptual action diagrams showing one example of the lock device 2105. As shown in FIGS. 10A to 10D, the lock device 2105 shown in FIG. 7A is schematically enlarged. The lock device 2105 is secured in the rear seat back 2102 shown in FIGS. 7A to 7D, and it is constructed such that rotational engagement members 2302 and 2303 are rotatably secured in a base casing 2301. The rotational engagement member 2302 is rotatable around a shaft 2302a, and the rotational engagement member 2303 is rotatable around a shaft 2303a.

Figure 10A:
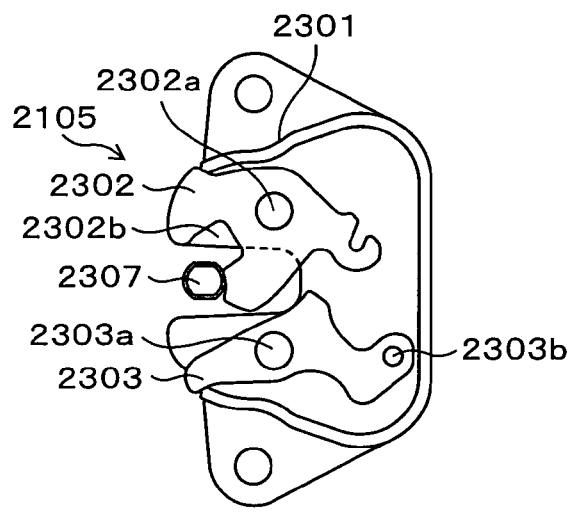
FIGS. 10A to 10D are conceptual schematic diagrams showing actions of a locking device.
Figure 10B:
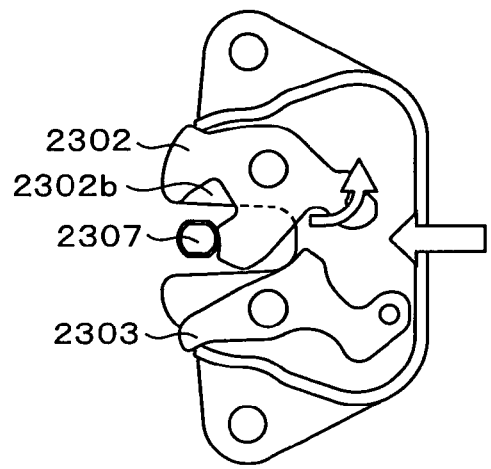
Figure 10C:
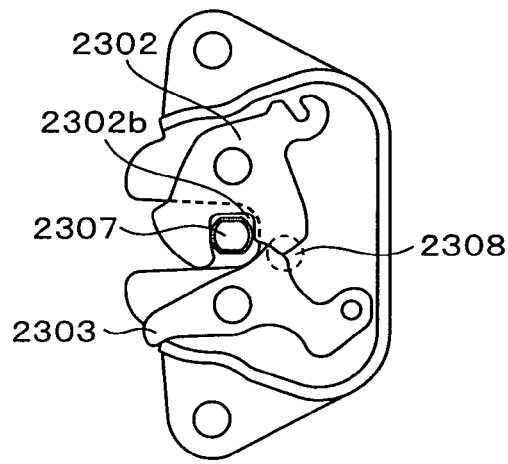
Figure 10D:
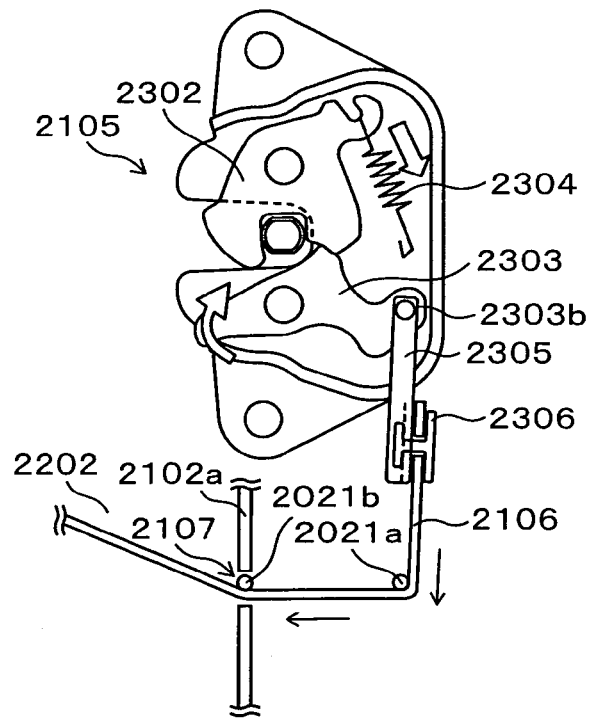

As shown in FIG. 10D, the rotational engagement member 2302 is pulled and biased by a spring 2304 in a clockwise direction. The bracket 2305 (connecting member) is mounted to the end portion of the rotational engagement member 2303 by the connecting pin 2303b so as to be rotatable therearound. At the other end of the bracket 2305, the end of the release strap 2106 is secured by the caulking fitting 2306. The direction of the release strap 2106 is changed to the left direction in the Figure by a steel wire portion 2021a having a rod-like cross section. The release strap 2106 extends from the opening 2107 (also see FIGS. 7A to 7D) to the inner space of the luggage compartment 2202 (also see FIG. 11) such that the upper surface of the release strap 2106 contacts (or is proximate to) a steel wire portion 2021b having the same cross section structure as that of the steel wire portion 2021a.

Reference numeral 2102a denotes a member covering the rear surface of the rear seat back 2102 shown in FIGS. 7A to 7D. Reference numeral 2307 denotes a vehicle side striker secured to a vehicle frame (frame structure of vehicle) of a car 2200 shown in FIG. 11 and described hereinafter. The vehicle side striker 2307 has a ring shape obtained by working of a rod-like member.

One example of the action of the lock device 2105 will be explained hereinafter with reference to FIGS. 10A to 10D. The rear seat back 2102 (see FIGS. 7A to 7D) is raised rearward from the forward tilt condition, and the lock device 2105 moves relatively close to the vehicle side striker 2307. In this case, the rotational engagement member 2302 is biased in a clockwise direction, thereby being in the condition shown in FIG. 10A.

When the raising action of the rear seat back 1102 (see FIGS. 7A to 7D) reaches a predetermined step, as shown in FIG. 10A, the vehicle side striker 2307 contacts the rotational engagement member 2302. When the rear seat back 2102 is further raised from this condition, the rotational engagement member 2302 rotates against the biased force in a counterclockwise direction (in FIG. 10B). When the rotational engagement members 2302 and 2303 are engaged with each other at a portion 2308, the rotational engagement member 2302 cannot further rotate in a counterclockwise direction, and the rear seat back 2102 cannot be further raised (in FIG. 10C).

When the condition shown in FIG. 10C is reached, the raising action of the rear back seat 2102 which was tilted forward is completed. In this condition shown in FIG. 10C, the vehicle side striker 2307 is fitted into a recess 2302b of the rotational engagement member 2302. In this condition shown in FIG. 10C, since the rotational engagement members 2302 and 2303 are engaged with each other at the portion 2308, the rotational engagement member 2302 cannot rotate in a clockwise direction in the Figure. Therefore, the rear seat back 2102 cannot be tilted forward from the condition shown in the FIG. 10C. That is, the lock device 2105 cannot move in the right direction in the Figure. Thus, in the raised condition of the rear seat back 2102 (see FIGS. 7A to 7D) shown in FIG. 7A, the rear seat back 2102 is secured (locked). This is a lock function of the lock device 2105.

In order to release the lock condition of the lock device 2105 shown in FIG. 10C, the release strap 2106 may be pulled from the rear side of the rear seat back 2102. In this case, the rotational engagement member 2303 rotates in a clockwise direction in the Figure, the engagement condition (shown in FIG. 10C) of the rotational engagement members 2302 and 2303 is released. The rotational engagement member 2302 rotates by the biased force of the spring 2304 in a clockwise direction in the Figure. When the rear seat back 2102 (shown in FIGS. 7A to 7D) is tilted forward, the action shown in FIG. 10B is performed, and the action shown in FIG. 10A is then performed. The vehicle side striker 2307 held by the lock device 2105 is released from the lock device 2105, and the lock device 2105 can relatively move in the right direction in the Figure. That is, the rear seat back 2102 can be tilted forward. Thus, by pulling the release strap 2106, the lock condition of the rear seat back 2105 by the lock device 2105 is released, and the forward tilt of the rear seat back 2102 can be performed.

Car with Rear Seat Apparatus

Figure 11:
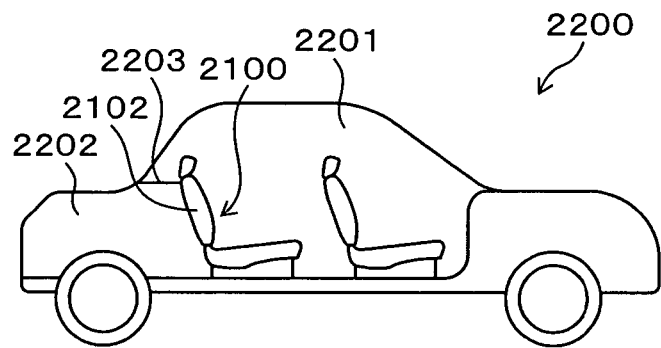
FIG. 11 is a conceptual diagram showing a vehicle having a rear seat apparatus according to a second aspect of the present invention.

FIG. 11 is a conceptual diagram showing one example of a car having the rear seat apparatus 2100 shown in FIGS. 7A to 7D. In FIG. 11, a car 2200 is shown. The car 2200 is equipped with a vehicle interior (passenger compartment) 2201 and a luggage compartment (rear section trunk) 2202. In the condition in which the rear seat back 2102 is raised, the rear surface of the rear seat back 2102 contacts a rear board 2203, and the vehicle interior 2201 and the luggage compartment 2202 are separated. The vehicle interior 2201, the luggage compartment 2202, and the rear board 2203 have the same structures as those of the vehicle interior 1201, the luggage compartment 1202, and the rear board 1203 of the car 1200 of the first embodiment of the first aspect of the present invention.

Arrangement Condition and Operation Example of Release Strap

The release strap 2106 has a first condition in which the leading end portion (the portion of the ring shape 2106a) of the release strap 2106 is positioned at the side of the luggage compartment 2202 (shown in FIG. 11) and a second condition in which the leading end portion (the portion of the ring shape 2106a) of the release strap 2106 is positioned so as to be accessible from the front side of the rear seat back 2102. The first condition or the second condition of the release strap 2106 can be selected. This will be explained hereinafter.

One example of the first condition is shown in FIGS. 7B and 7C. In this case, the leading end portion (in this case, the leading end portion of the ring shape 2106a) of the release strap 2106 is positioned at the rear surface side of the rear seat back 2102. In this condition, when the rear seat back 2102 is raised, and the above lock of the rear seat back 2102 by the lock device 2105 is performed, the leading end portion of the release strap 2106 is positioned in the luggage compartment 2202 (shown in FIG. 11). In this condition, the operation of the release strap 2106 cannot be performed from the side of the vehicle interior 2201. That is, when the rear seat back 2102 is raised, the rear surface of the rear seat back 2102 contacts the rear board 2203 (shown in FIG. 11), and the access from the side of the vehicle interior 2201 to the luggage compartment 2202 cannot be performed. Therefore, when the rear seat back 2102 is raised, the operation of the release strap 2106 in the condition shown in FIG. 7B or 7C cannot be performed. In this case, by operating the release strap 2106 from the side of the luggage compartment 2202, the forward tilt of the rear seat back 2102 can be performed.

One example of the above second condition is shown in FIG. 7D. In this case, the leading end portion (the portion of the ring shape 2106a) of the release strap 2106 is positioned so as to project upward from the rear surface side of the rear seat back 2102. In this condition, when the rear seat back 2102 is raised, and the above lock of the rear seat back 2102 by the lock device 2105 is performed, the leading end portion of the release strap 2106 is held between the rear surface of the rear seat back 2102 and the rear board 2203 (shown in FIG. 11). The leading end portion of the release strap 2106 is positioned in the vehicle interior 2201 (shown in FIG. 11). In this condition, the operation of the release strap 2106 from the side of the vehicle interior 2201 can be performed.

Advantages of Embodiment

In the operation of the release strap 2106 from the side of the vehicle interior 2201 shown in FIG. 11, the release strap 2106 is pulled upward from the opening 2107 (shown in FIG. 7B). In this case, by the guide 2021 shown in FIGS. 8 and 10A to 10D, the bent condition of the release strap 2106 is divided into two parts, and the bent condition does not have an acute angle (which is less than 90 degrees). Therefore, when the release strap 2106 is pulled from the side of the vehicle interior 2201 (shown in FIG. 11), it is unnecessary that the pulling force be excessively large. That is, on the side of the luggage compartment 2202 shown in FIG. 11, a large difference in pulling pressure between the pulling in the left direction and the pulling in the upper direction cannot be generated. As a result, the operability of the release strap 2106 can be improved.

Figure 12A:
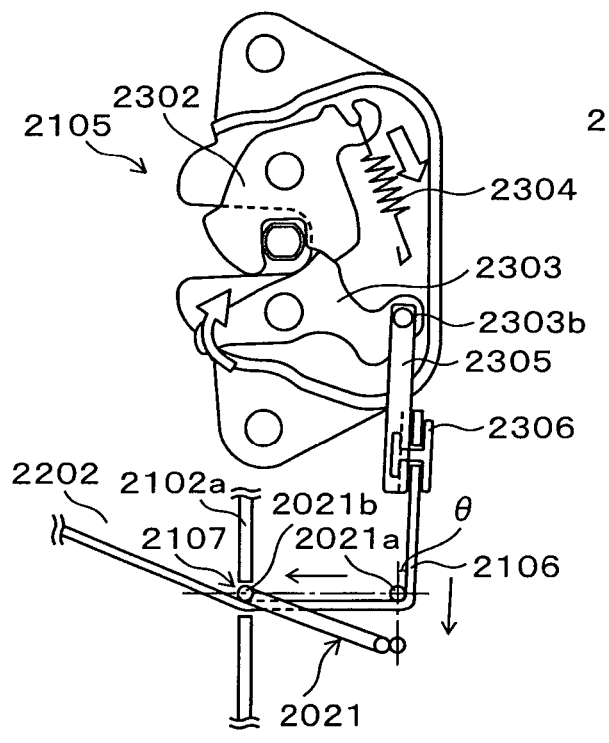
FIGS. 12A and 12B are conceptual diagram showing operation conditions of release strap.
Figure 12B:
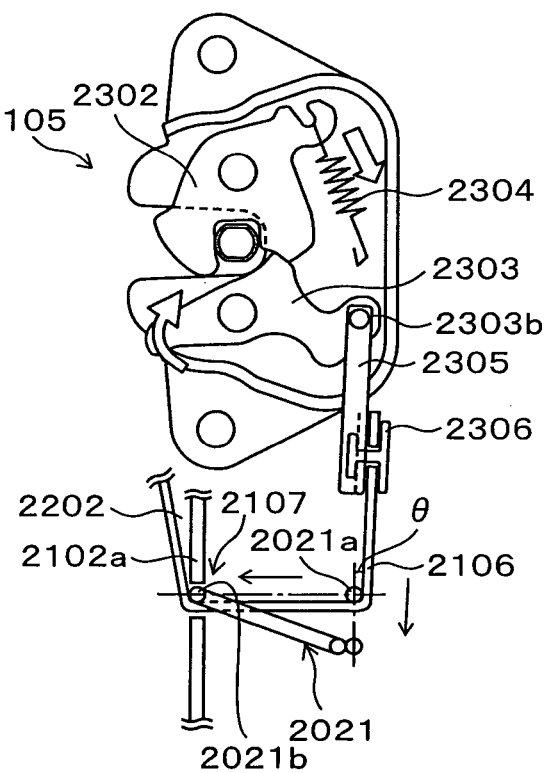

This will be explained hereinafter. As shown in FIG. 12A, the release strap 2106 is pulled from the side of the luggage compartment 2202 shown in FIG. 11. As shown in FIG. 12B, the release strap 2106 is pulled from the side of the vehicle interior 2201 shown in FIG. 11. First, as shown in FIG. 12A, when the condition (that is, the first condition of the second aspect of the present invention) shown in FIG. 7B or 7C is selected, the forward tilt of the rear seat back 2102 is performed by the pulling of the release strap 2106. In FIG. 12A, the release strap 2106 is pulled from the side of the luggage compartment 2202 (the pulling direction of the release strap 2106 is slightly upward with respect to a flat surface).

Next, as shown in FIG. 12B, when the condition (that is, the second condition of the second aspect of the present invention) shown in FIG. 7D is selected, the forward tilt of the rear seat back 2102 is performed by pulling of the release strap 2106. In FIG. 12B, the release strap 2106 is pulled from the side of the vehicle interior 2201 shown in FIG. 11. In this case, as shown in FIGS. 7A to 7D or 11, since the rear seat back 2102 is tilted rearward, the release strap 2106 is pulled in the oblique upper direction (left oblique upper direction in the Figure).

The release strap 2106 is bent step by step at the two portions of the steel wires 2021a and 2021b, and is thereby guided. Thus, even when the operations shown in FIGS. 12A and 12B are performed, the bend portions of the release strap do not have an acute angle, and the frictional force of the release strap 2106 received from the guide portions can be suppressed. The angle of the bend portion is defined as an angle of the portion of the release strap, which is bent by the guide portions and positions on the sides of the guide portions.

That is, in the features shown in FIGS. 12A and 12B, since the angle θ is more than 0 degrees and is less than 10 degrees (for example, 3 degrees), the angle of the bend portion of the release strap 2106 at the steel wire portion 2021a exceeds 90 degrees. In the feature shown in FIG. 12A, since the release strap 2106 is inevitably pulled in the left direction, the angle of the bend portion of the release strap 2106 at the steel wire portion 2021b exceeds 90 degrees. In the feature shown in FIG. 12B, the rear seat back (see reference numeral 2102 in FIGS. 7A to 7D or FIG. 11) is tilted rearward, and the steel wires 2021a and 2021b are positioned at the same height. Thus, even when the release strap 2106 is operated from the vehicle interior 2201, the angle of the bend portion of the release strap 2106 at the steel wire portion 2021b inevitably exceeds 90 degrees. That is, even when the release strap 2106 is pulled from the luggage compartment 2202 as shown in FIG. 12A, and even when the release strap 2106 is pulled from the vehicle interior 2201 as shown in FIG. 12B, the angle of the bend portion of the release strap 2106 at the steel wire portions 2021a and 2021b is obtuse.

When the angle of the bend portion of the release strap 2106 at the steel wire portions 2021a and 2021 is lower than 90 degrees, the frictional force received by the release strap 2106 thereat increases greatly. In particular, when the release strap 2106 is operated from the vehicle interior 2201, the bend angle at the guided portion is smaller than the bend angle obtained when the release strap 2106 is operated from the luggage compartment 2202. Thus, when the bend angle is less than 90 degrees, it is necessary to pull the release strap 2106 by larger force. Due to this, a large difference in operation sensation between the case in which the release strap 2106 is operated from the luggage compartment 2202 and the case in which the case in which the release strap 2106 is operated from the vehicle interior 2201 may be generated.

In the above feature, even when the release strap 2106 is pulled from the luggage compartment 2202 as shown in FIG. 12A, and even when the release strap 2106 is pulled from the vehicle interior 2201 as shown in FIG. 12B, the angle of the bend portion of the release strap 2106 at the steel wire portions 2021a and 2021b exceeds 90 degrees, large change of the frictional force received by the guide portions can be inhibited. Therefore, large difference in operation sensation between the two features cannot be generated. The load on the release strap 2106 and the steel wire portion 2021 can be inhibited when the operation shown in FIG. 12B is performed. Therefore, the durability and reliability of the apparatus can be improved.

If the guide of the release strap 2106 is performed by using the steel wire portion 2021a or 2021b (that is, only one of the steel wire portions), when the operation of release strap 2106 corresponding to that of FIG. 12B is performed, the angle of the bend portion is an acute angle that is much lower than 90 degrees. Due to this, the frictional resistance received by the release strap 2106 at the bend portion increases, and the large difference in operation sensation between the operations shown in FIGS. 12A and 12B may be generated. The load on the release strap 2106 and the steel wire portion may be larger in the operation shown in FIG. 12B.

7. Sixth Embodiment

The second aspect of the present invention can be applied to a construction in which a portion of rear seat back cam be tilted forward, as shown in FIG. 5, in the same manner as that in the second embodiment of the first aspect of the present invention.

In this feature, in the same manner as that shown in FIGS. 12A and 12B, the difference in frictional force between the one case in which the release strap is operated from the luggage compartment and the another case in which the release strap is operated from the vehicle interior can be inhibited. Thus, the deterioration of the performance and the breakage of the member can be prevented.

8. Modification Examples of Fifth and Sixth Embodiments

The secured position of the release strap is not limited to the rear seat back. For example, the secured position of the release strap can use the same position as the above modification examples of the first aspect of the present invention.

In the fifth and sixth embodiments, the case in which the second aspect of the present invention is applied to the rear seat apparatus is explained. The second aspect of the present invention can be applied to a seat apparatus other than the rear seat apparatus. For example, in a vehicle that has a first row seat apparatus, a second row seat apparatus, and a third row seat apparatus and has a seat construction enabling at least one of the second row seat apparatus and the third row seat apparatus to tilt forward, the second aspect of the present invention can be applied to the second row seat apparatus. In this case, the second aspect of the present invention can be applied to a construction in which one condition (first condition), in which forward tilt of the release strap is performed from the rear side of the seat apparatus, and another condition (second condition), in which forward tilt of the release strap is performed from the front side of the seat apparatus, can be selected. The second aspect of the present invention can be applied to a seat apparatus in which forward tilt of a passenger seat next to the driver's seat can be performed. The above seats can be applied to the first aspect of the present invention.

Figure 13:
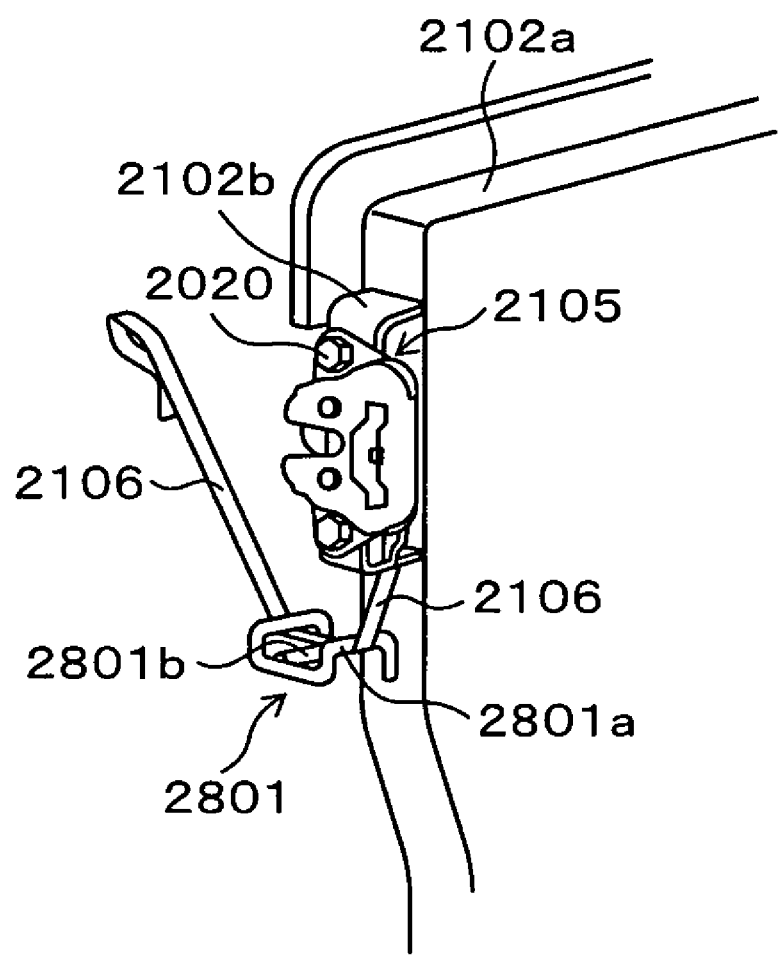
FIG. 13 is a perspective view showing another example of a guide member.

The embodiment of the guide device is not limited to the shape shown in FIG. 8. FIG. 13 is a conceptual diagram showing one example of another design of the guide device. In FIG. 13, a guide device 2801 is shown. The guide device 2801 is made of the same steel wire as the guide device 2021 shown in FIG. 8. The guide device 2801 contacts the release strap 2106 at steel wire portions 2801a and 2801b, and it guides the release strap 2106. The position relationship of the steel wire portions 2801a and 2802b is the same as that of the steel wire portions 2021a and 2021b. The guide function of the guide device 2801 is the same as that of the guide device 2021 shown in FIG. 8. The portions denoted by the same reference numerals in FIGS. 13 and in 8 have the same functions as shown in FIG. 8.

In order to reduce frictional force at a contact portion of the guide portion and the release strap, the surface of at least one of the guide portion and the release strap can use a material having a low coefficient of friction. For example, a fluorine resin coating is formed on the surface of at least one of the guide portion and the release strap, and the frictional force therebetween may be suppressed. A bearing or a pulley may be provided to the guide portion (for example, the steel wire portions 2021a and/or 2021b), and frictional resistance on the release strap is thereby converted to rolling friction, so that the frictional force can be reduced.

The second aspect of the present invention can be applied to a construction in which the securing device is secured to the vehicle body side and the striker is disposed to the seat back side. This case can be desirably used for the operation of the release strap performed from two directions (or from a wide angle range).

INDUSTRIAL APPLICABILITY

The second aspect of the present invention can be applied to a construction in which at least a portion of seat back of a vehicle (for example, a car) can be tilted forward. In particular, the second aspect of the present invention can be applied to a construction in which at least a portion of rear seat back of a vehicle (for example, a car) can be tilted forward.

What is claimed is:

1. A seat apparatus comprising:
   a seat back that is tilted rearward;
   a forward tilt device that allows at least a portion of the seat back to tilt forward;
   a securing device that secures the seat back at a vehicle body side;
   a release strap that is used for releasing a securing condition of the securing device and has a grip portion, wherein the release strap has a first condition in which the grip portion is positioned at a rear side of the seat back and a second condition in which the grip portion is positioned at a portion so as to be accessible from a front side of the seat back, and one of the first condition and the second condition of the release strap can be selected; and
   a guide device that includes a first guide portion that bends the release strap rearward at a lower side of the securing device, and a second guide portion that regulates the release strap from an upper side at a rear side of the first guide portion, wherein the release strap extends from the securing device to an oblique lower rear side and reaches the first guide portion,
   wherein the release strap is pulled rearward by the guide device after being pulled downward from the securing device, and bend portions of the release strap on the guide device have an angle that exceeds approximately 90 degrees.

* * * * *